United States Patent [19]
Cimprich

[11] 3,712,769
[45] Jan. 23, 1973

[54] TIRE LOADING APPARATUS WITH PREHEATING DEVICE FOR GREEN TIRES

[75] Inventor: Francis J. Cimprich, Canton, Ohio

[73] Assignee: The B. F. Goodrich Company, New York, N.Y.

[22] Filed: June 3, 1971

[21] Appl. No.: 149,693

[52] U.S. Cl. ........................425/28, 425/38, 425/43
[51] Int. Cl. ..................................................B29h 5/02
[58] Field of Search..........425/28, 31, 35, 38, 40, 41, 425/384, 32, 29, 34, 36, 33

[56] References Cited

UNITED STATES PATENTS

| | | | |
|---|---|---|---|
| 3,065,499 | 11/1962 | Brundage et al. | 425/32 |
| 3,267,515 | 8/1966 | Ulm | 425/29 |
| 3,339,230 | 9/1967 | Farrell | 425/384 |
| 3,476,840 | 11/1969 | Glassford | 425/384 X |
| 3,530,533 | 9/1970 | Turk et al. | 425/32 |
| 3,550,196 | 12/1970 | Gaguit | 425/34 |
| 3,553,784 | 1/1971 | Shuman | 425/384 X |
| 3,584,335 | 6/1971 | Ulm et al. | 425/36 |
| 3,640,653 | 2/1972 | Laenen | 425/33 |

*Primary Examiner*—J. Howard Flint, Jr.
*Attorney*—Joseph Januszkiewicz

[57] ABSTRACT

The preheating of selective thickest portions of a green tire as in the shoulder regions of a green tire as by a radiant heater to condition the green tire for vulcanization such that the green tire when vulcanized by the molding press receives and utilizes its maximum amount of heat energy to reduce the vulcanizing and curing cycle.

11 Claims, 4 Drawing Figures

INVENTOR.
FRANCIS J. CIMPRICH
BY Joseph Januszkiewicz
ATTY.

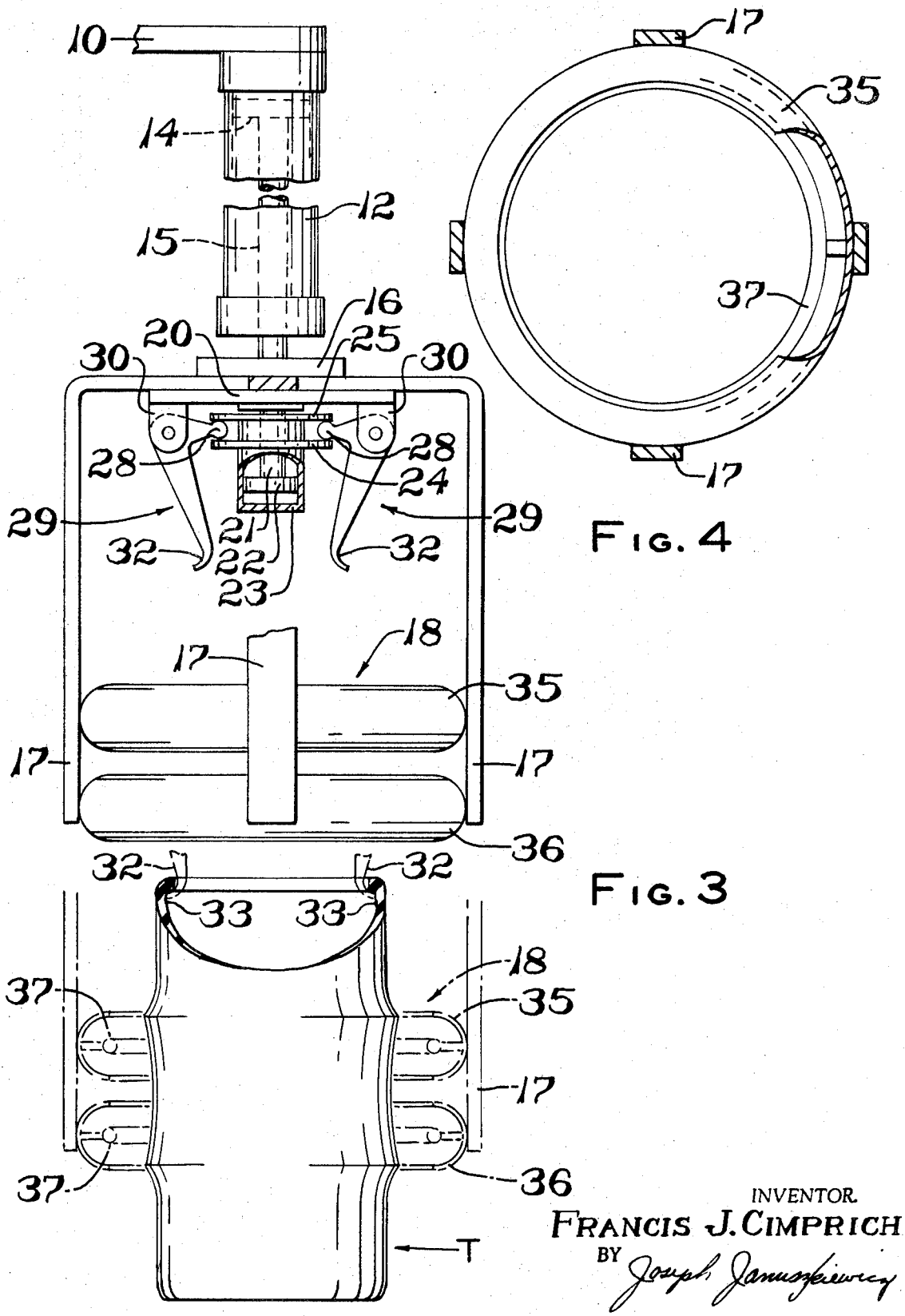

TIRE LOADING APPARATUS WITH PREHEATING DEVICE FOR GREEN TIRES

BACKGROUND OF THE INVENTION

This invention relates to an improvement in the vulcanization of tires.

Vulcanization of tires is the final stage in the preparation and fabrication of tires, be they radial, bias, or bias belted. In the construction of pneumatic tires it is the practice to first build the tire carcass in pulley-band form about a tire building drum by wrapping a plurality of layers of fabric reinforced ply stock. The ply stock is turned over the beads at the ends of the drum and then this tread stock is applied. There are many variations in this basic process depending on the number of plies, type of fabric, and also depending on the type of additional layers or strips applied, such as breakers, belts, chafer strips, and sidewall strips. Such green tire is of a cylindrical form or pulley-band form. The shaping and vulcanization of such cylindrical form is accomplished in a curing press wherein the press receives the green tire in its cylindrical form, secures the respective ends or beads and moves such beads towards each other while pressurizing the interior of the tire to fill a tire mold as by a bladder or steam pressure. The mold consists of a pair of complementary annular mold sections which, when in mating engagement, define a cavity of tire shape. When the mold sections are in mating engagement, curing medium is circulated through the interior of the tire while the mold sections are heated. Upon completion of the vulcanization, the shaped tire is removed from the mold. In the case of radial tires, the tire carcass is pre-shaped prior to vulcanization.

The vulcanization process is a complex step because the tire is not uniform in shape, the heat transfer process takes place under complex conditions of non-uniform transfer, and rubber is a poor conductor of heat.

The present invention contemplates an apparatus for the preheating of selected portions only of a green tire as by a heater means on a loading device to reduce the overall time necessary to vulcanize a tire.

Through the use of a heater such as spaced radiant heaters, heat is concentrated in a narrow width beam at each shoulder region of the green tire and only that portion of the tire is heated which is the thickest. In the case of radial tires the tread region is preheated. The advantage of this is that when such preheated tire is placed in the mold for vulcanization, maximum heat energy is utilized and the overall cure time is reduced. Such preheating provides for efficient use of heat energy minimizing excess heat being dissipated with no overheating. Heretofore, the conventional method of curing a tire utilized the vulcanizing press exclusively such that the heat energy was applied uniformly to the tire; however, being that rubber is a poor conductor of heat, it was necessary to apply heat energy for a given time period as determined by the thickest portion of the tire which heat energy was provided to all portions of the tire at a uniform rate. Considering the tire as a heat sink, its rate of absorption of heat was limited, and to pour more heat energy into the vulcanization process did not aid since the rate of heat absorption was limited. Further, some heat energy was wasted as in sidewalls, where the rate of absorption of heat energy was good compared to the tread and shoulder portions. The advantage of the preheating as set forth by this invention is that the vulcanization press cycle time is reduced, yet one is able to manipulate the tire automatically for press loading. As an example of this on a G78×14 four ply tire, the cure cycle was reduced by a minimum of 2 minutes on a 17.5 minute cure cycle. On larger size tires the cure cycle is reduced further. Another benefit of the selective preheating of tires according to this invention is that when the preheated tire is placed in the mold, the tire can be shaped to the mold volume with approximately 50 per cent less shaping pressure than the standard shaping pressure.

The cost savings effected by reducing the cure time is dependent on the size tire being vulcanized and the type of equipment used. The net result is that preheating of green tires makes it easier to shape them and to increase the productivity per square foot of floor space and any reduction in cure cycle time will reflect substantially on the overall cure cost. Such reduction in cure time increases the overall efficiency of vulcanization. Although the invention is shown and described with respect to a flat band preheating, the invention is equally applicable to pre-shaped tires such as radial tires.

SUMMARY OF THE INVENTION

The present invention contemplates an improved apparatus for vulcanizing tires wherein a green tire is preheated by a heater device on a tire carcass loader only at the thickest portions immediately prior to the placement of such green tire into the vulcanizing mold. Such selected preheating conditions the tire for easier molding and reduces the overall vulcanization time.

BRIEF DESCRIPTION OF THE DRAWINGS

FIG. 3 is a side elevational view of the loader and heater means with portions broken away, and showing the heater means in the operative position in phantom lines.

FIG. 4 is a plan view of the heater means with portions broken away.

Figure 1:
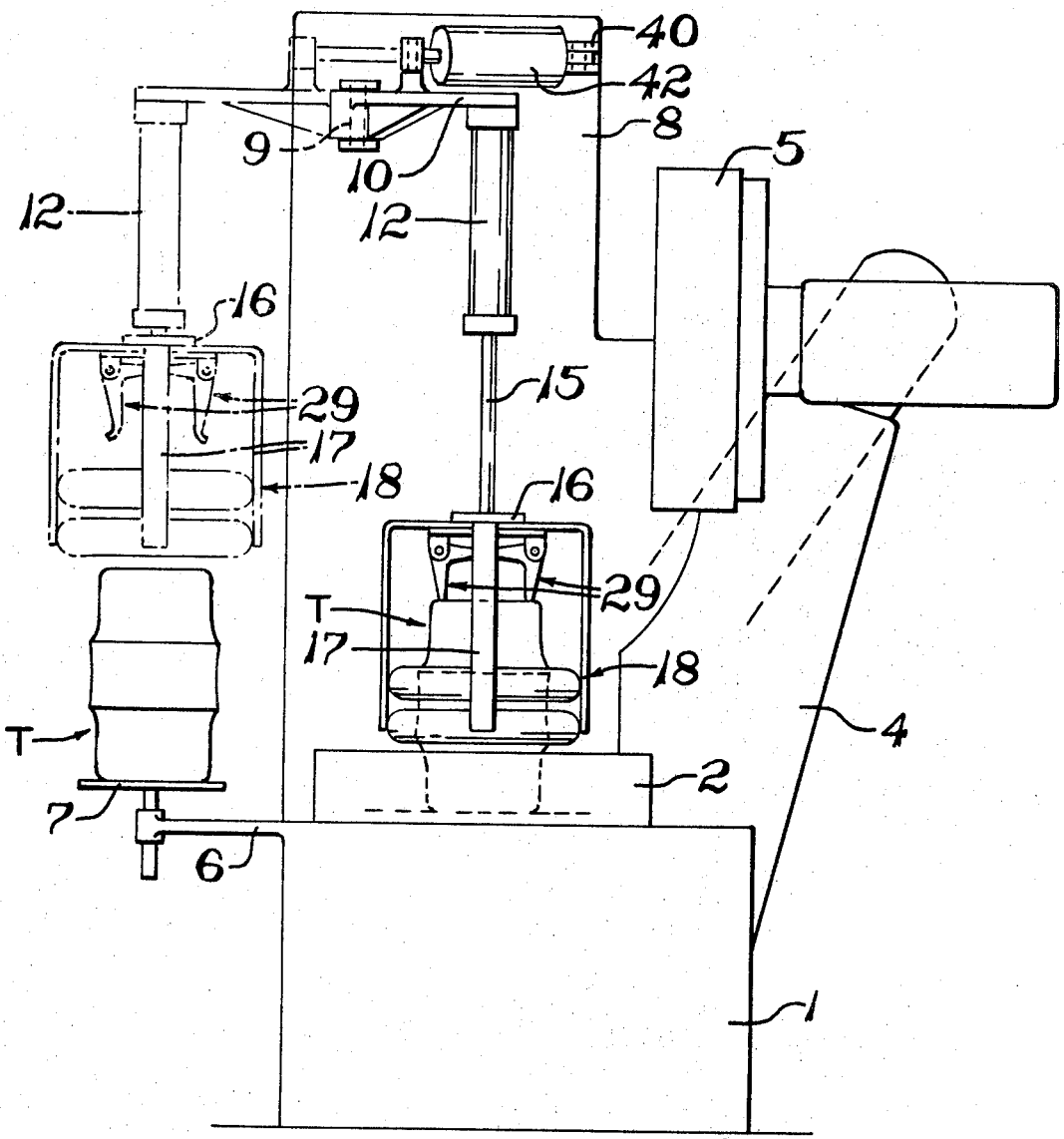
FIG. 1 is a general side elevational view of a press with heater means in cooperation with a loader.

Referring to the drawings wherein like reference characters designate like or corresponding parts throughout the several views, there is shown in FIG. 1 a base 1 supporting a lower mold section 2. Base 1 supports a bracket 4 which pivotally supports upper mold section 5. Mold section 5 is suitably moved into mating engagement with the lower mold section 2 to mold a green tire T, shown in pulley band form in FIG. 1. Suitable bull gears or cam plates and guide slots with suitable guide rollers facilitate the opening and closing of the press sections in a manner old and well-known in the art. See U.S. Pat. No. 3,065,503. When the press is in closed position, the top and bottom mold sections 2 and 5 are in mating engagement thereby forming a tire-shape cavity therebetween in which a tire is adapted to be cured to final shape by a circulation of curing medium such as hot water or steam under pressure through the interior of the green tire or through a diaphragm that is in contact with the green tire. In the open position, the upper mold section 5 is offset from the bottom mold section 2 such that a green tire may be positioned into the bottom mold section 2 without interference.

Secured to base 1 is a laterally extending bracket 6, which supports a pan 7 upon which may be placed a green tire T, which is to be loaded into the press. A bracket 8 is located generally rearwardly of the press, which bracket 8 is shown generally in FIG. 1, although any other suitable support means may be used. Journaled as at 9 on one end of bracket 8 (FIG. 2) is a lever arm 10. The one end of arm 10 has the head end of a pneumatic cylinder 12 secured thereto. Cylinder 12 has a piston 14 mounted therein for reciprocal movement. A rod 15 is secured to piston 14 for movement therewith. The lower end of rod 15 has a flange 16 secured thereto. Four L-shaped brackets 17 (FIGS. 2 and 4) have their one ends secured to flange 16 such that they are equally spaced and have their one leg diverging outwardly from flange 16 at 90° quadrants. The other end of L-shaped brackets 17 support heating means 18. Secured to the one end of bracket 17 is a flange 20 which supports for movement therewith a piston rod 21. One end of piston rod 21 supports a piston 22. Mounted for reciprocable movement on rod 21 is a cylinder 23. The upper portion of cylinder 23 has a pair of spaced flanges 24 and 25 secured thereto to captively engage one end 28 of a plurality of bell cranks 29. Only one bell crank 28 will be described. The pivot support of crank 29 is journaled on a bracket 30 that is secured to flange 20. The other end of crank 29 has a curved portion 32 to facilitate the lifting of a green tire T from pan 7 by engagement of the respective curved portions 32 of the crank 29 with the inner bead portion 33 of the green tire T. Pressurization of the head end of cylinder 23 moves the cylinder 23 downwardly only slightly while pivoting the curved portions 32 outwardly for a purpose to be described.

The heating means 18 comprises a pair of spaced annular reflectors 35, 36 secured to the brackets 17. Each reflector as seen in FIG. 3 is hemispherical in cross section, although other shapes are contemplated such as a parabolic to more precisely reflect the radiant energy to the tire shoulder. Suitably secured to the respective reflectors 35 and 36 are heating elements or rods 37 which are connected to a suitable source of power supply. For purposes of this embodiment the heating elements are Cromalox elements which upon receiving energy aim a narrow width band of radiant heat at each shoulder of the green tire while held in the loader of the press. Bracket 8 supports a U-shaped bracket 40 (FIG. 2) to which is pivotally supported as at 41 a pneumatic cylinder 42. The rod end of cylinder 42 is pivotally connected to the intermediate portion of lever arm 10.

In the operation of the described apparatus assume a tire T is resting on pan 7, with the press loading mechanism in the up position shown in phantom lines in FIG. 1. Upon pressurization of the head end of cylinder 12, piston rod 15 is moved downwardly along with brackets 17 and bell cranks 29 until portion 32 bell cranks 29 is inside tire T. The head end of cylinder 23 is pressurized which extends cylinder 23 along with ends 28 of cranks 29 thereby pivoting cranks 29 about their pivot support on bracket 30 to swing the respective curved portions 32 outwardly, such that curved portions 32 engage the inner bead portion 33 of tire T.

The heating elements 37 are then energized to heat up such elements to their desired energy level such that elements 37 in cooperation with reflectors 35 and 36 emit a narrow band of radiant heat to the respective shoulders of the green tire. Upon completion of the vulcanization of a tire in the press, the upper mold section 5 is raised in a conventional manner, ejecting the tire therefrom and being in a condition to receive the next green tire for vulcanization thereof. The rod end of cylinder 12 is then pressurized to move the rod 15 along with the green tire held by the bell crank 29 upwardly. Also see U.S. Pat. No. 2,927,343 for the vulcanizing press and mechanism for servicing the press.

Figure 2:
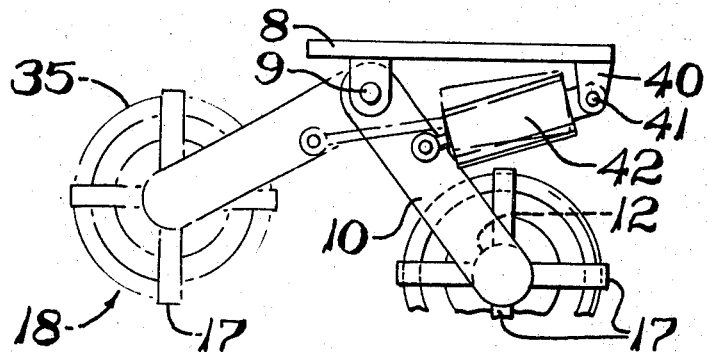
FIG. 2 is a fragmentary plan view of the loader and heater means.

With the lever arm 10 being in the position shown in phantom lines in FIG. 2, cylinder 42 is energized to swing the brackets 17 along with the green tire T to the position shown by the full lines in FIG. 2, which positions the green tire immediately above mold 2. The head end of cylinder 12 is then pressurized to move tire T downwardly into position on the mold 2. The tire T is released from the loading mechanism by pressurizing the rod end of cylinder 23, which moves cylinder 23 upwardly to swing the respective curved portions 32 inwardly to release the tire T. The rod end of cylinder 12 is then pressurized to move the rod 15 along with the bell cranks 29 upwardly away from the mold 2. Simultaneously with such action either an operator places a tire T on the pan 7 or a tire T is automatically placed thereon by a conveyor means, wherein such placement is not a part of this invention. Cylinder 42 is then pressurized to swing lever arm 10 in a clockwise direction as viewed in FIG. 2 to position the bell cranks 29 and the heater means 18 into the position shown in FIG. 2. Thereafter the head end of cylinder 12 is pressurized to move the heater means 18 and the bell crank 29 along with the curved portions 32 into tire engaging position. The upper mold section 5 is then pivoted into complementary engagement with the lower mold section 2 for the curing or vulcanization process in a manner old and well understood in the art. The gripping and sealing of the respective ends of the green tire prior to the closing of the press is not detailed as it forms no part of the invention. For closure and gripping means see U.S. Pat. No. 2,921,337. The preheating of the green tire reduces the overall time necessary for vulcanization and does not interfere with the loader in its ability to hold the green tire. Where the entire tire is preheated, the green tire softens and yields under the application of heat and renders it unmanageable. The preheater described is adjustable to various tire sizes and specifications. The preheater may be internal of the tire and preheat those prescribed portions that are thickest.

Modifications are contemplated and may obviously be resorted to by those skilled in the art without department from the described invention, as hereinafter defined by the appended claims, as only a preferred embodiment thereof has been disclosed.

I claim:

1. An apparatus for the conditioning of tires for vulcanization comprising a mold press for the vulcanization of tires; said press having at least a pair of mold sections cooperative to define a mold cavity for the reception of a green tire and for shaping such tire into a toroidal shape; a loading means operative to receive a cylindrical tire for positioning such green tire into one of said mold sections; and a heating means secured to said loading means and encompassing said loading means for heating the circumferential extending shoulder area of said green tire held by said loading means prior to positioning within the mold press.

2. An apparatus as set forth in claim 1 wherein said heating means includes a pair of axially spaced annular heaters; and each heater has a circumferentially extending reflector for directing the energy from said heaters radially toward the shoulder area of said green tire.

3. An apparatus as set forth in claim 2 wherein each of said annular heaters is a Cromalox tubular metal element, and power means connected to each of said metal elements for supplying energy thereto for heating said elements.

4. An apparatus as set forth in claim 2 wherein each of said reflectors are parabolic in cross-section.

5. An apparatus for the pre-heating of tires prior to positioning into a mold press for the vulcanization of tires including, a tire vulcanizing mold press, bracket means for mounting on said mold press, said bracket having chuck means for holding a green cylindrical tire for loading into said press, a horizontal plate member secured to the lower portion of said mold press for locating a cylindrical green tire thereon, reflector means mounted on said bracket means, said reflector means being circumferentially extending and having an inner circular surface for reflecting energy radially inwardly, and heater means located adjacent to said inner circular surface of said reflector means for supplying heat energy directed towards a green tire held by said chuck means directly from said heater means and reflected from said inner circular surface of said reflector means.

6. An apparatus as set forth in claim 5 wherein said chuck means includes a plurality of lever means, power operated means mounted on said chuck means operatively connected to said lever means for pivoting said lever means into contact with the periphery of a green tire for holding such tire on said chuck means, and motive means connected to said bracket means for swinging said chuck means between a loading position and an unloading position to position a green tire into said mold press.

7. An apparatus as set forth in claim 6 wherein said reflector means comprises a plurality of axially spaced annular reflectors, and each reflector having a heater means therein.

8. An apparatus as set forth in claim 7 wherein said reflector means comprises a pair of axially spaced annular reflectors, each reflector being semi-circular in cross section with the inner curved surface disposed to reflect the heat energy radially inwardly towards the center of the annular reflector, and each of said reflectors having a heater means.

9. An apparatus for the conditioning of tires for vulcanization comprising, a tire vulcanizing mold press, a loading device for loading a green tire into said mold press for vulcanization, said loading device having chuck means for gripping a green tire, control means connected to said load device for swinging said chuck means between an inoperative position and an operative position, said chuck means in said operative position depositing a tire in said mold press, said control means cooperative with said chuck means in said inoperative position to grip a green tire, and heater means mounted on said loading device for movement therewith for pre-heating a green tire held by said chuck means.

10. An apparatus for the conditioning of tires for vulcanization as set forth in claim 9 wherein said heater means includes annular radiant heater means for heating the shoulder regions of a green tire.

11. An apparatus as set forth in claim 9 wherein said heating means includes a pair of axially spaced annular heaters, and each heater has a circumferentially extending reflector for directing the energy from said heaters radially toward the shoulder area of a green tire held by said chuck means.

* * * * *